(12) United States Patent
Bakhuis et al.

(10) Patent No.: US 7,669,334 B2
(45) Date of Patent: Mar. 2, 2010

(54) SYSTEM AND METHOD FOR FORMING A BLADE-SECTION

(75) Inventors: Jan Willem Bakhuis, Nijverdal (NL); Andrew John Billen, Daarlerveen (NL); Sjef van Breugel, Overijssel (NL); Jamie Thomas Livingston, Pensacola, FL (US)

(73) Assignee: General Electric Company, Schenectady, NY (US)

(*) Notice: Subject to any disclaimer, the term of this patent is extended or adjusted under 35 U.S.C. 154(b) by 1107 days.

(21) Appl. No.: 11/313,181

(22) Filed: Dec. 19, 2005

(65) Prior Publication Data

US 2007/0140865 A1  Jun. 21, 2007

(51) Int. Cl.
*B25B 27/14* (2006.01)
*B21D 11/02* (2006.01)
*B21D 31/00* (2006.01)
*B21D 41/00* (2006.01)
*B21D 53/78* (2006.01)

(52) U.S. Cl. .................. 29/898.07; 29/281.6; 29/889; 29/889.6; 29/889.72; 72/302; 72/379.2; 72/395

(58) Field of Classification Search ............ 29/281.6, 29/428, 448, 525, 889, 889.6, 889.61, 889.7, 29/889.72; 72/302, 379.2, 395, 296, 305, 72/311, 300, 308, 363, 369; 164/6; 206/523, 206/526, 521; 249/114.1, 122; 416/248, 416/146 R
See application file for complete search history.

(56) References Cited

U.S. PATENT DOCUMENTS

| | | | |
|---|---|---|---|
| 5,430,937 A * | 7/1995 | Leahy et al. | 29/889.6 |
| 5,499,904 A * | 3/1996 | Wallace et al. | 416/230 |
| 6,018,970 A * | 2/2000 | Ford et al. | 72/21.5 |
| 6,415,510 B2 * | 7/2002 | Mertens et al. | 29/897.2 |

* cited by examiner

*Primary Examiner*—David P Bryant
*Assistant Examiner*—Alexander P Taousakis
(74) *Attorney, Agent, or Firm*—Cantor Colburn LLP (57) ABSTRACT

Disclosed is a system for forming a blade-section including a transporting frame, at least one transporting support removeably associated with the transporting frame, and a blade-section forming structure receptive of the transporting frame and the at least one transporting support.

8 Claims, 9 Drawing Sheets

SYSTEM AND METHOD FOR FORMING A BLADE-SECTION

FIELD OF THE INVENTION

This disclosure relates generally to a system for forming a blade-section, and more particularly to a system for forming at least one blade-section.

BACKGROUND OF THE INVENTION

Rotorblades, such as those found in large wind turbines, typically contain at least one pliable rootsection layer, consisting of fiberglass or glass composites including biaxial and unidirectional fibers. These rootsection layers are currently installed within the rotorblade via a process that includes cutting the glass into rootsections, rolling the individual sections onto a plurality of tubes, transporting the tubes to a rotorblade mold, unrolling each section on each tube, and individually layering and installing each rootsection into the rotorblade mold where it will eventually be treated to harden and form the rotorblade. Moreover, as each rootsection is layered into the rotorblade mold, that rootsection must be taped or clamped in place within the blade to facilitate a forming of each rootsection layer to the rotorblade's shape.

While this process is an effective means of forming and installing rootsections within the rotorblade, it can be time consuming, in that individually rolling, unrolling, layering, and taping of each rootsection layer requires multiple, individual rootsection layer handlings. Moreover, because of these multiple handlings, structural defect probability within the layers, and thus the rotorblade, can be high due to human error. This is because, with each handling of the glass (on the tube, off the tube, and into the blade), the probability of layer wrinkling and distortion increases, affecting blade structure. Furthermore, each piece of tape added to the layers can cause inconsistency and warping within the glass, further impacting structural integrity. For these reasons, there is a desire for a more efficient system and method for forming and installing glass rootsections within a rotorblade.

BRIEF DESCRIPTION OF THE INVENTION

Disclosed is a system for forming a blade-section including a transporting frame, at least one transporting support removeably associated with the transporting frame, and a blade-section forming structure receptive of the transporting frame and the at least one transporting support.

Also disclosed is a method for forming a blade-section, including disposing at least one blade-section layer upon at least one transporting support, wherein the transporting support is associated with a transporting frame, disposing the at least one blade-section layer upon a blade-section forming structure by associating the transporting frame and the at least one transporting support with the blade-section forming structure, supporting the at least one blade-section layer with the blade-section forming structure which includes a blade-section producing configuration, wherein the at least one blade-section layer is allowed to form to the blade-section producing configuration, and installing the at least one blade-section layer and the blade-section forming structure within a rotorblade mold.

BRIEF DESCRIPTION OF THE DRAWINGS

The foregoing and other features and advantages of the present invention should be more fully understood from the following detailed description of illustrative embodiments taken in conjuncture with the accompanying Figures in which like elements are numbered alike in the several Figures.

DETAILED DESCRIPTION OF THE INVENTION

Significant efficiency in construction of a portion of a rotorblade is achievable by creating a lay-up of glass material apart from the rotorblade and then installing the lay-up as a single component.

Figure 1:
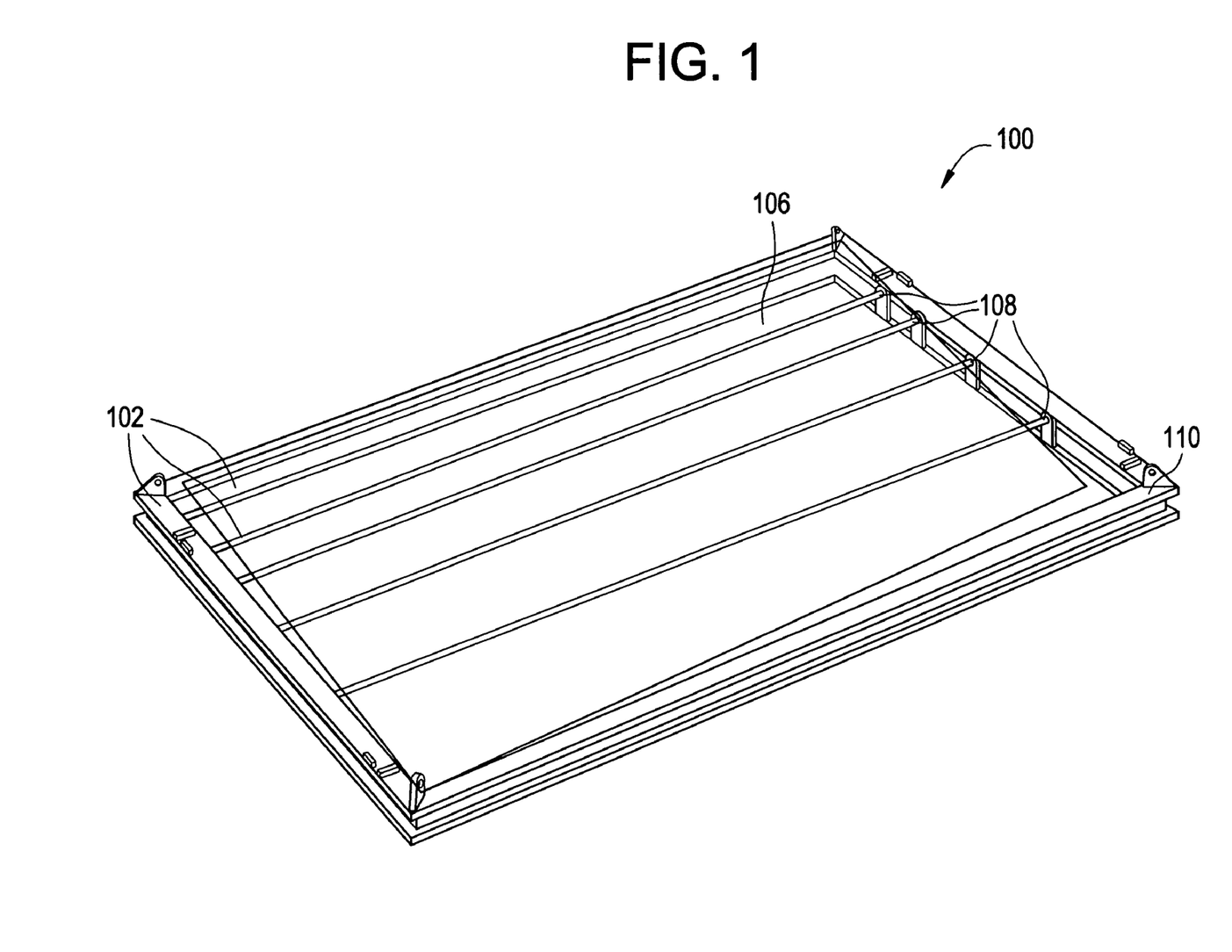
FIG. 1 is a top perspective view of a transporting arrangement in accordance with an exemplary embodiment.
Figure 2:
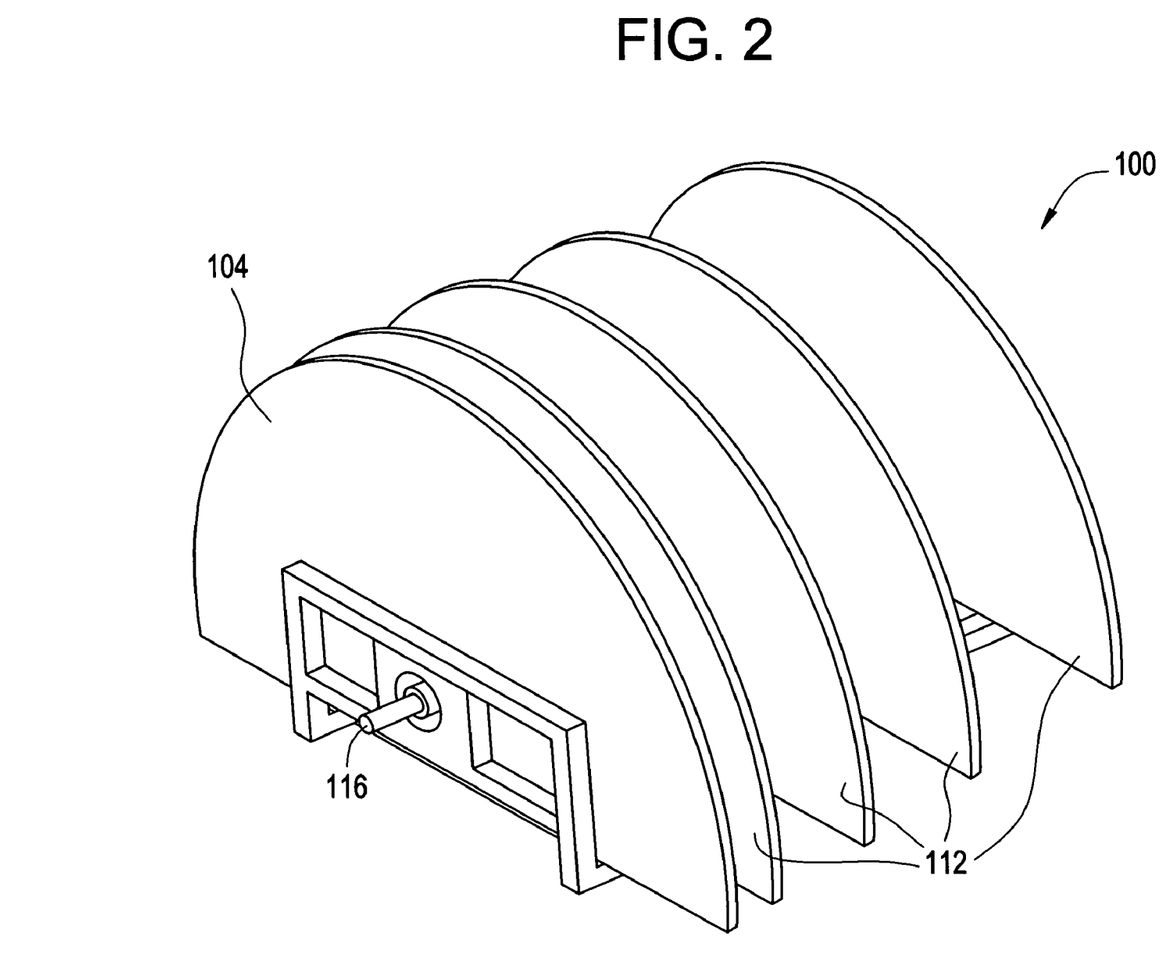
FIG. 2 is a side perspective view of a blade-section forming structure in accordance with the exemplary embodiment.
Figure 3:
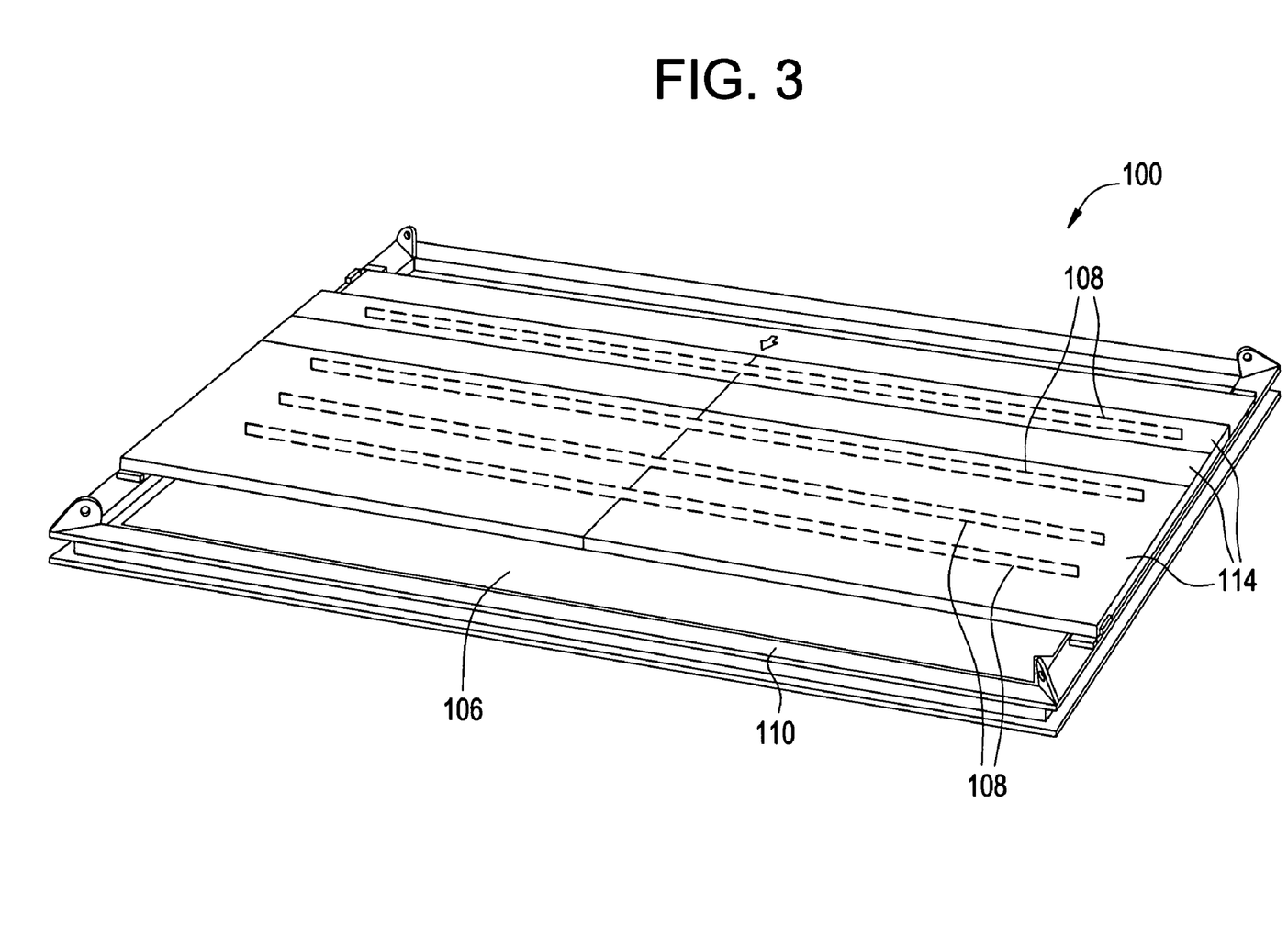
FIG. 3 is a top perspective view of blade-section layers and the transporting arrangement in accordance with the exemplary embodiment.

Referring to FIGS. 1, 2, and 3 an exemplary embodiment of a system 100 for forming a blade-section is illustrated, and includes a transporting arrangement 102 and a blade-section forming structure 104. The transporting arrangement 102 includes at least one transporting support, a transporting frame 110, and an optional a transporting surface 106, wherein the transporting surface 106, if employed, is removeably associated with the at least one transporting support 108 and the transporting frame 110. The at least one transporting support and transporting frame 110 are rigid in form, whereas the transporting surface 106 (optional) is pliable, and comprised from a group consisting of elastomeric materials, polymeric materials, and compounds including one of the foregoing materials. The at least one transporting support is illustrated as support bars 108, which are removeably associated with the transport frame 110. This removeable association is accomplished via any means desirable, such as but not limited to the support bars 108 associating and disassociating with a plurality of eye cavities defined by the transport frame 110. Thusly, if employed, the transport surface 106 lies adjacent to, and can be supported by, the support bars 108 that are in association with the transport frame 110.

Figure 4:
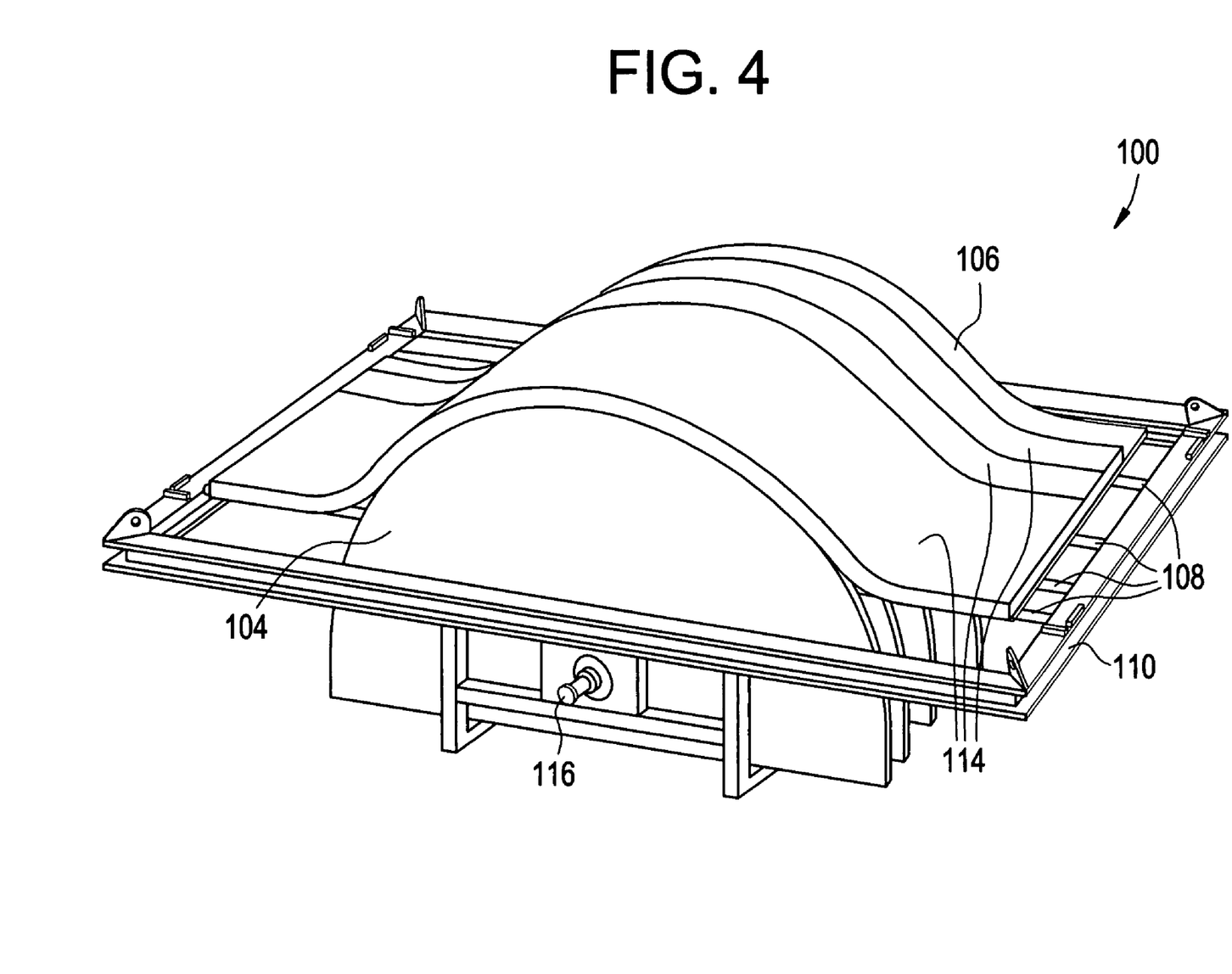
FIG. 4 is a side perspective view of a blade-section forming structure, the blade-section layers, and the transporting arrangement in accordance with the exemplary embodiment.
Figure 7:
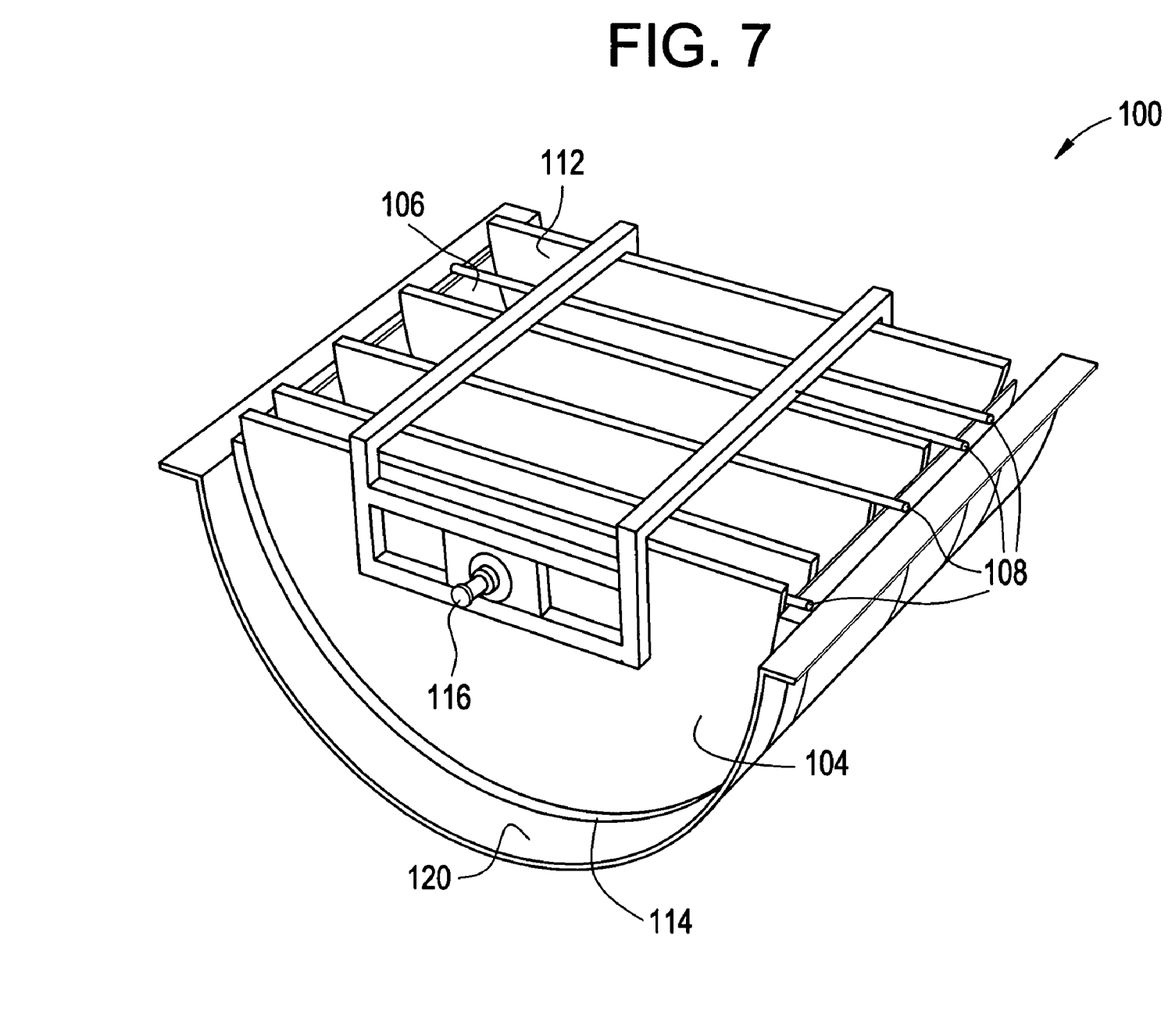
FIG. 7 is a side perspective view of the blade-section forming structure rotated about an axis in accordance with the exemplary embodiment.
Figure 8:
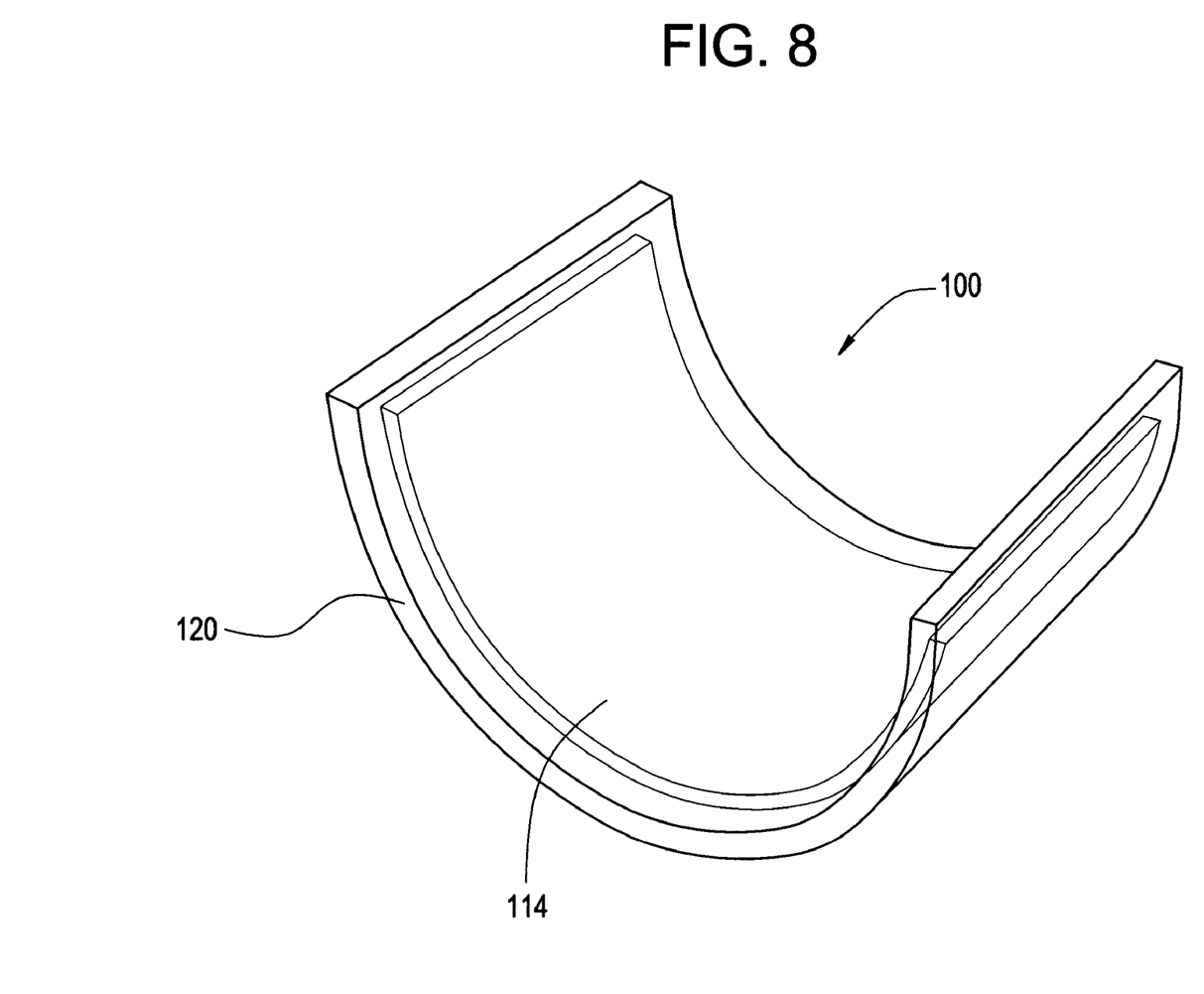
FIG. 8 is a side perspective view of blade-section layers disposed within a rotorblade mold in accordance with the exemplary embodiment.

Referring now to FIGS. 2, 3, and 4 the blade-section forming structure 104, introduced above, defines at least one support cavity (illustrated as support cavities 112), and includes a blade-section producing configuration or shape. For example, the blade-section forming structure 104 is configured in the negative impression of a rotorblade mold. Thus, when at least one pliable blade-section layer 114, such as thin layers of glass, fiberglass, or glass composites including biaxial and unidirectional fibers, is allowed to conform to the blade-section producing configuration of the blade-section forming structure 104, the at least one blade-section layer 114 will be formed into a shape that can be installed within a rotorblade mold 120, and lie adjacently to a rotorblade mold wall, as shown in FIGS. 7 and 8. It should be appreciated that the blade-section forming structure 104 is rotatable about an axis 116 disposed within the blade-section forming structure 104, wherein this rotatability aids in installation of the at least one blade-section layer 114 within the rotorblade mold 120. The process by which this formation and installation takes place will be described in greater detail hereinbelow.

Referring to FIG. 3 the at least one blade-section layer 114 is shown lying adjacently to the transporting surface 106, wherein the transporting surface 106 is supported by the at least one transporting support 108 in association with the transporting frame 110. It should be appreciated however, that if the optional transporting surface 106 is not employed, the at least one blade-section layers 114 will be supported by the at least one transporting support (illustrated as the transporting support bars 108) and/or transporting frame 110 to which the at least one transporting support is associated.

Figure 5:
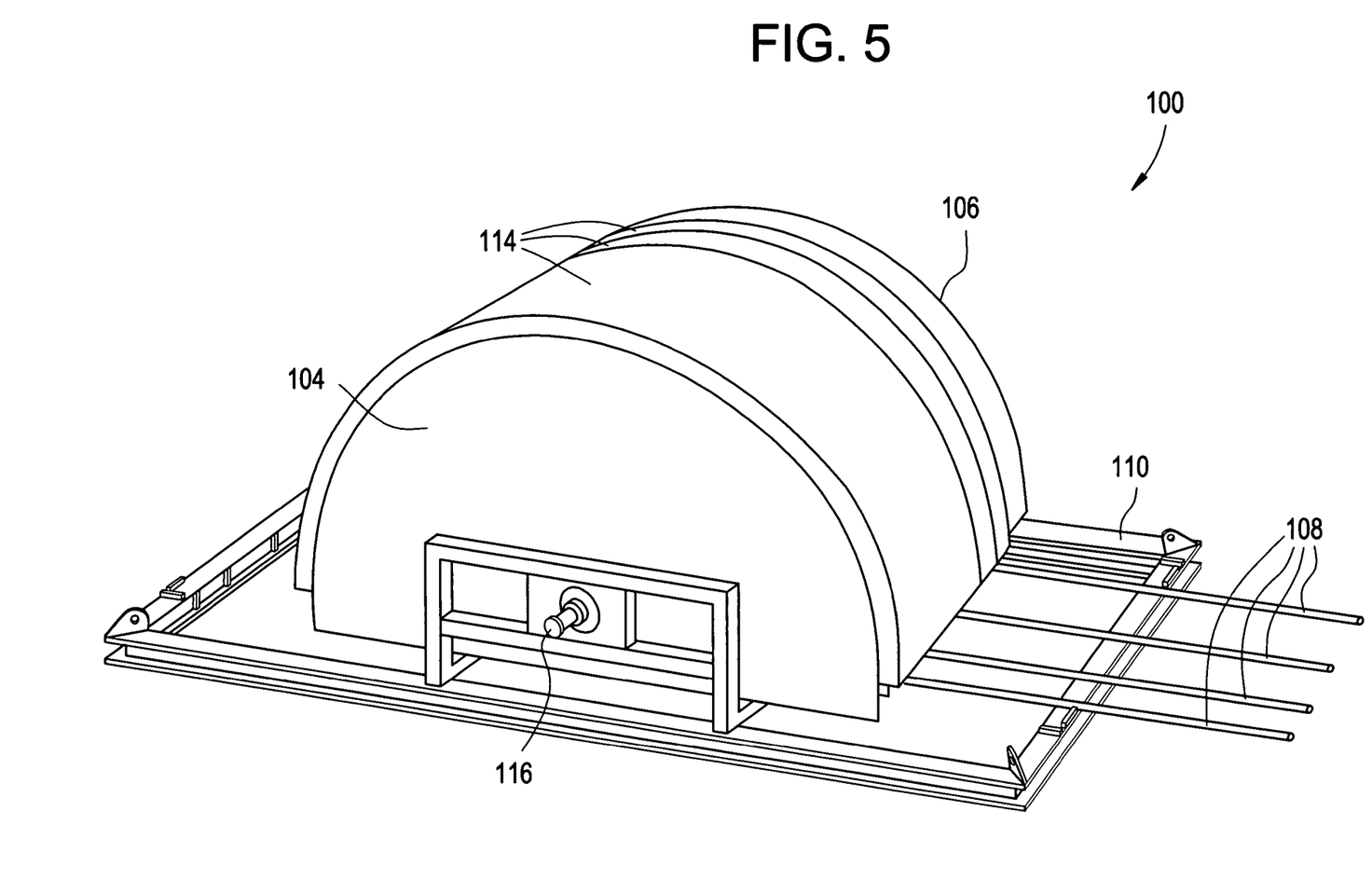
FIG. 5 is a side perspective view of the blade-section layers disposed upon the blade-section forming structure in accordance with the exemplary embodiment.

The at least one blade-section layer 114 is transported via this transporting arrangement 102 (with or without the transporting surface 106) to the blade-section forming structure 104 illustrated in FIGS. 2, 4, and 5, wherein the at least one blade-section layers 114 and transporting surface 106 are disposed upon the blade-section forming structure 104. As the transporting surface 106 and at least one blade-section layers 114 are disposed (all at once) upon the blade-section forming structure 104, the transporting support bars 108 enter the support cavities 112, allowing the transporting surface 106 (acting a buffer between the blade-section forming structure 104 and at least one blade-section layer) to contact the blade-section forming structure 104, while releasing the at least one transporting support 108 from contact with transporting surface 106, and support of, the transporting surface 106 and at least one blade-section layers 114. When the transporting surface 106 and the at least one blade section layers 114 are supported as illustrated in FIG. 5, the transporting surface 106 and all of the at least one blade-section layers 114 form to the blade-section producing configuration of the blade-section forming structure 104, which is now responsible for supporting the transporting surface 106 and at least one blade-section layers 114. The transporting support bars 108 are then disassociated from the eye cavities of the transporting frame 110 and removed from the support cavities 112 illustrated in FIG. 2. The transporting frame may also now be removed from the vicinity of the blade-section forming structure 104. It should be appreciated that if the pliable transporting surface 106 is not employed to support and transport the at least one blade-section layers 114, the at least one blade-section layers 114 will be disposed upon the blade-section forming structure 104, conforming to the blade-section producing configuration without the optional presence and buffer provided by the transporting surface 106.

Figure 6:
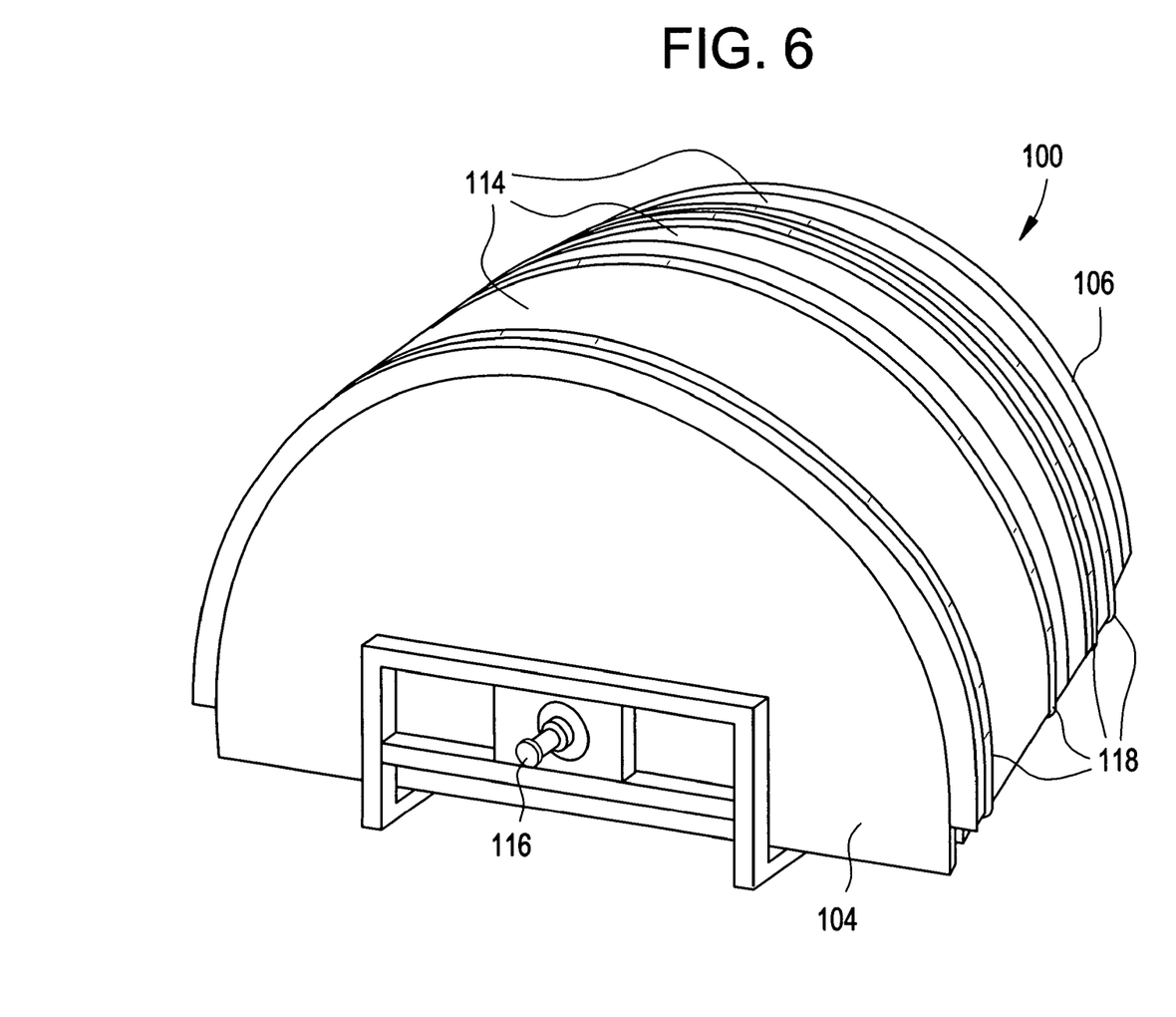
FIG. 6 is a side perspective view of securing structures securing the blade-section layers to the blade-section forming structure in accordance with the exemplary embodiment.

Referring now to FIGS. 6 and 7, once (or during) the at least one blade-section layer 114, and transporting surface 106 if employed, have formed to the blade-section producing configuration of the blade-section forming structure 104, securing devices 118, such as but not limited to straps, secure the at least one blade-section layer 114 (and transporting surface 106, which is illustrated but optional) to the blade-section securing structure 104. The now secured blade-section layers 114 are then rotated along with the blade-section forming structure 104 about the axis 116. This rotation may be to any degree desirable to facilitation of installment of the at least one blade-section layer 114 within the rotorblade mold 120, such as but not limited to 180 degrees.

Referring now to FIG. 7, the at least one blade-section layer 114, transporting surface (if present), and the blade-section forming structure 104 have been rotated 180 degrees, and installed within the rotorblade mold 120. Once installed, the securing devices 118 and blade-section forming structure 104 are removed from the rotorblade mold 120 (along with the transporting structure 106 if present), wherein all of the at least one blade-section layers 114 are installed via this one installment step, and remain in said rotorblade mold as shown in FIG. 8. The blade-section layers 114 are then treated with a hardening agent, such as resin, which solidifies the blade-section layers 114, forming a rotorblade structure. By forming and installing all of the at least one blade-section layers 114 at once, as opposed to the one at a time procedure used in the prior art, efficiency in time and structural integrity (less opportunity for wrinkling and no tape) is increased. It should be appreciated that blade-section layers 114 may be formed within an entire rotorblade, or any section thereof, including a rootsection.

Figure 9:
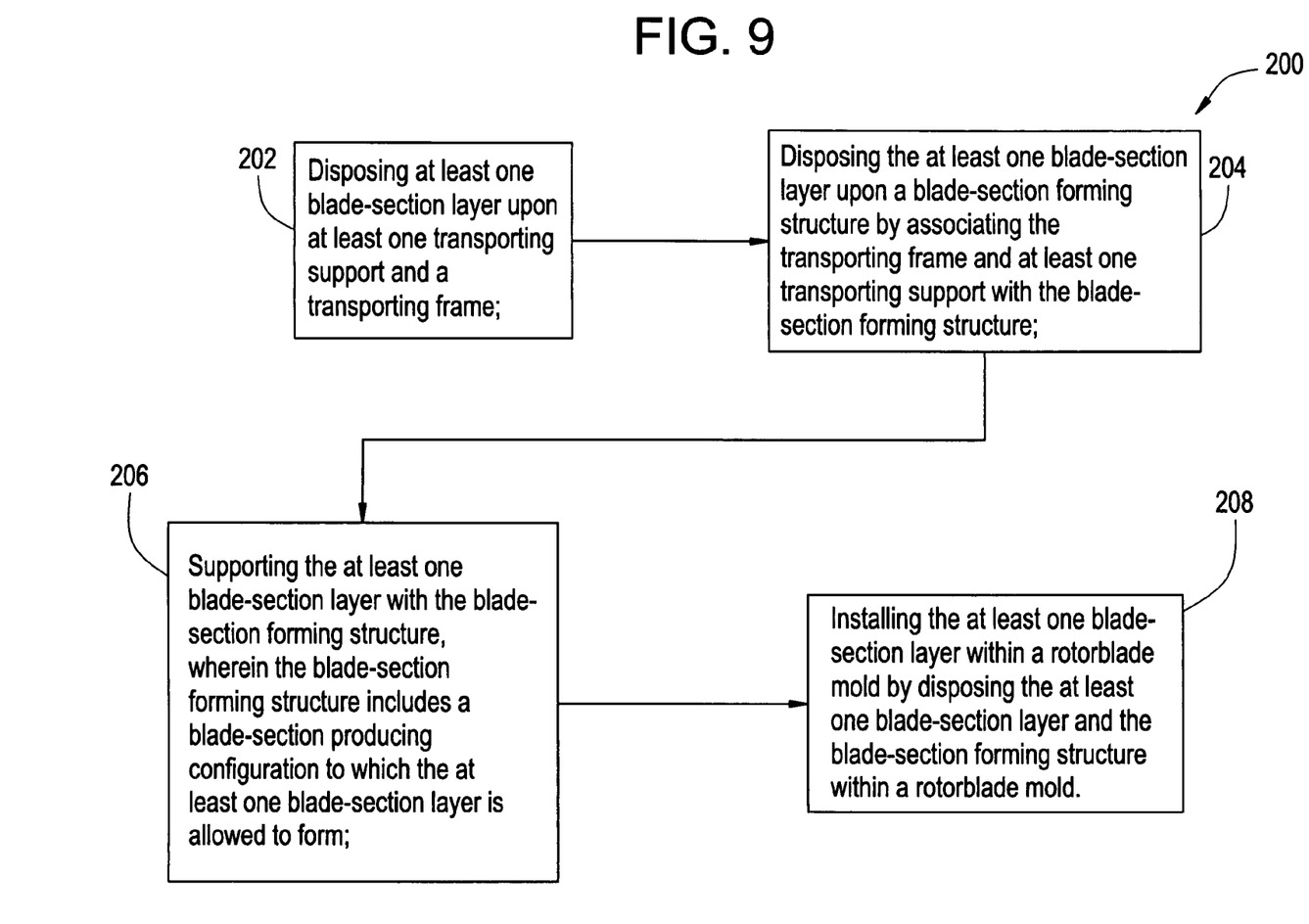
FIG. 9 is a block diagram illustrating a method for forming a blade-section.

Referring to FIG. 9, a method 200 for forming a blade-section is illustrated, and includes disposing at least one blade-section layer 114 upon at least one transporting support and a transporting frame 110 as shown in Operational Block 202. The method 200 may also include disposing the at least one blade-section layer 114 upon a transporting surface 106, wherein the transporting surface 106 is pliable and removeably associated with the at least one transporting support and the transporting frame 110. Additionally, the method 200 includes transporting the at least one blade-section layer 114, along with the transporting surface 106 if present, to the blade-section forming structure 104 via the at least one transporting support and the transporting frame 110.

The method 200 further includes disposing the at least one blade-section layer 114 upon a blade-section forming structure 104 by associating the transporting frame 110 and at least one transporting support with the blade-section forming structure 104, as shown in Operational Block 204, wherein the blade-section forming structure 104 defines at least one support cavity and includes a blade-section producing configuration. If the at least one blade-section layer is disposed upon the transporting surface 106 (as mentioned above), the method 200 still further includes disposing the transporting surface 106 and the at least one blade-section layer 114 upon the blade-section forming structure 104, wherein the transporting surface 106 acts as a buffer between the blade-section forming structure 104 and the at least one blade-section layer 114.

In addition, the method 200 includes supporting the at least one blade-section layer 114 with the blade-section forming structure 104, wherein the blade-section forming structure 104 includes a blade-section producing configuration to which the at least one blade-section layer 114 is allowed to form, as shown in Operational Block 206. Again, if the at least one blade-section layer is disposed upon the transporting surface 106, the method 200 further includes supporting said transporting surface 106 and the at least one blade-section layer 114 with the blade-section forming structure 104, wherein the at least one blade-section layer 114 and the transporting surface 106 are allowed to form to the blade-section producing configuration. The method 200 also includes removing the at least one transporting support and transporting frame from association with the blade-section producing structure 104, wherein the at least one blade-section layer is thus disposed upon (and supported by) the blade-section forming structure 104 instead of the at least one transporting support and transporting frame 110.

After or during formation, the method 200 still further includes securing the at least one blade-section layer 114 to the blade-section forming structure 104, and rotating the blade-section forming structure 104 about an axis 116.

Referring to Operational Block 208, the method 200 also includes installing the at least one blade-section layer 114 within a rotorblade mold 120 by disposing the at least one blade-section layer 114 and the blade-section forming structure 104 within a rotorblade mold 120. Still again, if the at least one blade-section layer is disposed upon the transporting surface 106, the method 200 will additionally include installing the transporting surface 106 within the rotorblade mold 120 along with the at least one blade-section layer 114 and the blade-section forming structure 104. Additionally, the method 200 includes removing the blade-section forming structure 104 and the transporting surface 106 (if present) from the rotorblade mold 120, and solidifying the at least one blade-section layer 114 to form at least a portion of a rotorblade.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A system for forming a blade-section, the system comprising:
    a frame formed to define an aperture;
    a support, associated with the frame and on which a blade-section layer is disposable, the support being removable from the frame in a first direction; and
    a forming structure formed to define a cavity receptive of the support and movable through the aperture in the first direction such that the blade-section layer is removable from the support and the support, being receivable in the cavity, is removable from the frame.

2. A system according to claim 1, wherein said frame and said at least one support are rigid.

3. A system according to claim 1, including a surface which is pliable and removeably associated with said frame and said at least one support.

4. A system according to claim 3, wherein said surface comprises elastomeric materials, polymeric materials, or compounds including one of the foregoing materials.

5. A system according to claim 1, wherein said forming structure includes a blade-section producing configuration.

6. A system according to claim 1, wherein said forming structure is rotatable about an axis.

7. The system according to claim 1, wherein the forming structure forms the blade-section layer into a rotor blade shape.

8. The system according to claim 1, wherein the first direction is substantially perpendicular to a surface of the blade-section layer, and
    wherein the support is removable from the cavity in a second direction, which is substantially perpendicular to the first direction.

* * * * *